United States Patent
Block et al.

(10) Patent No.: US 11,032,296 B1
(45) Date of Patent: *Jun. 8, 2021

(54) ROGUE ENDPOINT DETECTION

(71) Applicant: Wells Fargo Bank, N.A., San Francisco, CA (US)

(72) Inventors: Matthew John Block, Winston Salem, NC (US); Adam Sheesley, Mocksville, NC (US); Jon Matthew Welborn, Winston Salem, NC (US); James Robert Borecky, Winston Salem, NC (US); Jennifer A. Holton, Clemmons, NC (US); Douglas S. Rodgers, Mooresville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,862

(22) Filed: Mar. 11, 2019

Related U.S. Application Data

(63) Continuation of application No. 15/153,067, filed on May 12, 2016, now Pat. No. 10,230,743.

(51) Int. Cl.
*H04L 29/06* (2006.01)
(52) U.S. Cl.
CPC ...... *H04L 63/1416* (2013.01); *H04L 63/1425* (2013.01); *H04L 63/1433* (2013.01); *H04L 63/20* (2013.01)
(58) Field of Classification Search
CPC ............. H04L 63/1433; H04L 63/1425; H04L 63/1416; H04L 63/20
See application file for complete search history.

(56) References Cited

U.S. PATENT DOCUMENTS

| 6,381,650 | B1 | 4/2002 | Peacock |
| 7,562,390 | B1 * | 7/2009 | Kwan ................ H04L 63/0236 726/23 |
| 7,808,958 | B1 * | 10/2010 | Hernacki .............. H04W 12/12 370/338 |
| 7,873,993 | B2 | 1/2011 | King |
| 7,954,090 | B1 | 5/2011 | Qureshi et al. |
| 7,958,556 | B2 | 6/2011 | Roesch et al. |
| 8,086,729 | B1 | 12/2011 | Hindawi et al. |

(Continued)

OTHER PUBLICATIONS

C. Onwubiko, "Cyber security operations centre: Security monitoring for protecting business and supporting cyber defense strategy," 2015 International Conference on Cyber Situational Awareness, Data Analytics and Assessment (CyberSA), London, 2015, pp. 1-10. (Year: 2015).*

(Continued)

*Primary Examiner* — Kari L Schmidt
(74) *Attorney, Agent, or Firm* — Shumaker & Sieffert, P.A.

(57) ABSTRACT

Evaluating computers, devices, or endpoints on a network, such as a large network of computers in an enterprise environment. Detecting computers, devices, or endpoints that may present a security risk to the network or may be compromised in some way. Generating network traffic that, in some cases, should be ignored or should prompt specific, known responses. Detecting endpoint(s) that respond to such network traffic in an anomalous way, or otherwise attempt to perform certain operations based on such network traffic.

20 Claims, 10 Drawing Sheets

(56) References Cited

U.S. PATENT DOCUMENTS

| | | | |
|---|---|---|---|
| 8,138,975 B2 | 3/2012 | Bull et al. | |
| 8,484,385 B2 | 7/2013 | Narayanaswamy et al. | |
| 8,549,634 B2 | 10/2013 | Dubey et al. | |
| 8,838,759 B1* | 9/2014 | Eatough | H04L 41/085 709/223 |
| 8,903,973 B1 | 12/2014 | Hindawi et al. | |
| 8,904,039 B1 | 12/2014 | Hindawi et al. | |
| 8,972,566 B1 | 3/2015 | Hindawi et al. | |
| 9,059,961 B2 | 6/2015 | Hindawi et al. | |
| 9,060,017 B2 | 6/2015 | Marion et al. | |
| 9,088,894 B1 | 7/2015 | Kaushik et al. | |
| 9,137,255 B2 | 9/2015 | Lambert | |
| 9,154,479 B1* | 10/2015 | Sethi | H04L 63/0227 |
| 9,240,976 B1* | 1/2016 | Murchison | H04L 63/145 |
| 9,246,977 B2 | 1/2016 | Hindawi et al. | |
| 9,641,544 B1 | 5/2017 | Treat | |
| 9,730,075 B1* | 8/2017 | Shavell | H04W 12/12 |
| 9,769,037 B2 | 9/2017 | Hindawi et al. | |
| 10,148,688 B1* | 12/2018 | Shavell | H04L 43/10 |
| 10,425,310 B2* | 9/2019 | Thubert | H04L 41/12 |
| 10,462,171 B2* | 10/2019 | Weingarten | G06F 8/61 |
| 2003/0043853 A1* | 3/2003 | Doyle | H04L 29/12009 370/489 |
| 2003/0135762 A1 | 7/2003 | Macaulay | |
| 2007/0058598 A1* | 3/2007 | Ling | H04W 12/122 370/338 |
| 2007/0118908 A1 | 5/2007 | Brown et al. | |
| 2007/0298720 A1* | 12/2007 | Wolman | H04L 63/1408 455/66.1 |
| 2007/0299777 A1* | 12/2007 | Shraim | H04L 63/1441 705/51 |
| 2008/0037576 A1 | 2/2008 | Hwang et al. | |
| 2010/0077483 A1* | 3/2010 | Stolfo | H04L 63/1466 726/24 |
| 2011/0271345 A1* | 11/2011 | Wolman | H04L 63/1408 726/23 |
| 2011/0302652 A1 | 12/2011 | Westerfield | |
| 2013/0019298 A1* | 1/2013 | Jover Segura | H04L 63/1466 726/7 |
| 2013/0097710 A1 | 4/2013 | Basavapatna et al. | |
| 2013/0318170 A1 | 11/2013 | Crume | |
| 2014/0052508 A1 | 2/2014 | Pandey et al. | |
| 2014/0118113 A1* | 5/2014 | Kaushik | G01S 5/0231 340/8.1 |
| 2014/0181247 A1 | 6/2014 | Hindawi et al. | |
| 2014/0181295 A1 | 6/2014 | Hindawi et al. | |
| 2014/0310811 A1* | 10/2014 | Hentunen | H04L 61/305 726/23 |
| 2015/0013006 A1* | 1/2015 | Shulman | H04L 63/0263 726/23 |
| 2015/0106889 A1 | 4/2015 | Sharabani et al. | |
| 2015/0121529 A1 | 4/2015 | Quinlan et al. | |
| 2015/0143524 A1* | 5/2015 | Chestna | G06F 21/53 726/25 |
| 2015/0149624 A1 | 5/2015 | Hindawi et al. | |
| 2015/0163132 A1 | 6/2015 | Hindawi et al. | |
| 2015/0163236 A1* | 6/2015 | Niemela | H04L 63/1425 726/23 |
| 2015/0271284 A1 | 9/2015 | Hindawi et al. | |
| 2015/0271285 A1 | 9/2015 | Hindawi et al. | |
| 2015/0288711 A1* | 10/2015 | Jorgensen | H04L 63/1441 726/23 |
| 2016/0072838 A1* | 3/2016 | Kolton | H04L 63/145 726/23 |
| 2016/0112450 A1* | 4/2016 | Basavapatna | G06F 21/577 726/23 |
| 2016/0234163 A1* | 8/2016 | Nistor | H04L 61/2567 |
| 2016/0308725 A1 | 10/2016 | Tang et al. | |
| 2017/0149775 A1 | 5/2017 | Bachar et al. | |
| 2017/0214703 A1 | 7/2017 | Tekchandani | |
| 2017/0237760 A1 | 8/2017 | Holeman et al. | |
| 2017/0264589 A1 | 9/2017 | Hunt et al. | |
| 2017/0264628 A1 | 9/2017 | Treat et al. | |
| 2017/0277792 A1 | 9/2017 | Cohen et al. | |
| 2017/0359306 A1* | 12/2017 | Thomas | H04L 63/10 |
| 2018/0146008 A1 | 5/2018 | Vissamsetty et al. | |
| 2018/0309787 A1* | 10/2018 | Evron | G06F 21/121 |

OTHER PUBLICATIONS

Bahl, Paramvir, et al. "Enhancing the security of corporate Wi-Fi networks using DAIR." Proceedings of the 4th international conference on Mobile systems, applications and services. 2006, pp. 1-14. (Year: 2006).*

L. Watkins, W. H. Robinson and R. Beyah, "A Passive Solution to the CPU Resource Discovery Problem in Cluster Grid Networks," in IEEE Transactions on Parallel and Distributed Systems, vol. 22, No. 12, pp. 2000-2007, Dec. 2011. (Year: 2011).*

H. Han, B. Sheng, C. C. Tan, Q. Li and S. Lu, "A Timing-Based Scheme for Rogue AP Detection," in IEEE Transactions on Parallel and Distributed Systems, vol. 22, No. 11, pp. 1912-1925, Nov. 2011,. (Year: 2011).*

Fosaaen "Identifying Rogue NBNS Spoofers," retrieved from (https://blog.netspi.com/author/karl-fosaaen/), Sep. 5, 2013, 8 pgs.

Stone-Gross et al. "FIRE: FIndng Rogue nEtworks," Computer Security Applications Conference, Dec. 7-11, 2009, 10 pgs.

Han et al. "A measurement based rogue ap detection scheme." INFOCOM 2009, IEEE. IEEE, Apr. 19-25, 2009, 9 pp.

Faria et al.,"Detecting identity-based attacks in wireless networks using signalprints," Proceedings of the 5th ACM workshop on Wireless security. ACM, Sep. 29, 2006, 10 pp.

Xu et al. "Device fingerprinting in wireless networks: Challenges and opportunities." IEEE Communications Surveys &Tutorials, Sep. 3, 2015, 22 pp.

Prosecution History from U.S. Appl. No. 15/153,067, dated Jan. 18, 2018 through Oct. 31, 2018, 96 pp.

* cited by examiner

ROGUE ENDPOINT DETECTION

CROSS REFERENCE

This application is a continuation application of and claims priority to U.S. application Ser. No. 15/153,067, filed on May 12, 2016, which is hereby incorporated by reference herein in its entirety.

TECHNICAL FIELD

This disclosure relates generally to computer security and, more particularly, to detection of security risks in a network.

BACKGROUND

A large network, such as an enterprise network for a large commercial enterprise, may connect many diverse devices. An enterprise network for a multinational bank, for example, may be among the largest enterprise networks currently constructed, and such a network will span numerous countries and connect branch offices throughout the world. An enterprise network of such scale may include hundreds of thousands of endpoints, and possibly thousands of subnets. Such a network is not only difficult to manage and administer, but it is also very difficult to protect from security risks and other threats. Each of the many endpoints on a network may be a potential security risk, and threats to the network may potentially be delivered through any endpoint.

SUMMARY

In general, this disclosure describes techniques that include evaluating computers, devices, or endpoints on a network, such as a network of computers in an enterprise environment. In some examples, this disclosure describes techniques that include detecting computers, devices, or endpoints that may present a security risk to the network or may be compromised in some way. There are a number of reasons an endpoint may be a security risk or may be compromised in some way, and such reasons include infections by malware or malicious software, malfunction, or operation by a malicious user.

In some examples, such as where the network is under control of an enterprise, many attributes relating to the structure of the network and the endpoints on the network may be known to an administrator of the network. By taking advantage of knowledge of the network, it may be possible for computers on the network to generate network traffic that, in some cases, should be ignored or should prompt specific, known responses. If an endpoint responds to such network traffic in an anomalous way, or otherwise attempts to perform certain operations based on such network traffic, that endpoint may not be operating properly, and may be recognized as a rogue device that presents a security risk to the network.

In one example, a method comprises sending, over a network and by a server device, a first set of instructions to a first endpoint device connected to a first subnet, wherein the network comprises a first subnet including a first plurality of endpoints and a second subnet including a second plurality of endpoints, and wherein the first set of instructions cause the first endpoint device to generate a first set of network activity that is chosen so that no properly operating endpoint will respond to the first set of network activity, sending, over the network and by the server device, a second set of instructions to a second endpoint device connected to the second subnet, wherein the second set of instructions cause the second endpoint device to generate a second set of network activity that is chosen so that no properly operating endpoint will respond to the second set of network activity, and sending, over the network by the server device after sending the second set of instructions, a request for information from the second endpoint device.

In another example, a server device may include a network interface configured to send and receive data via a network, wherein the network comprises a first subnet including a first plurality of endpoints and a second subnet including a second plurality of endpoints, and a processor. The processor may be configured to send, over the network, a first set of instructions to a first endpoint device connected to the first subnet, wherein the first set of instructions cause the first endpoint device to generate a first set of network activity that is chosen so that no properly operating endpoint will respond to the first set of network activity, send, over the network, a second set of instructions to a second endpoint device connected to the second subnet, wherein the second set of instructions cause the second endpoint device to generate a second set of network activity that is chosen so that no properly operating endpoint will respond to the second set of network activity, and send, over the network, a request for information from the second endpoint device.

In another example, a system may include a network comprising a first subnet having a plurality of first subnet endpoints, and a second subnet having a plurality of second subnet endpoints, a server device connected to the network, a first endpoint device, connected to the first subnet, comprising a first processor configured to receive a command from the server device, and responsive to receiving the command, generate a first set of network activity in the first subnet, the first set of network activity being chosen so that no properly operating first subnet endpoint will respond to the first set of network activity in a manner inconsistent with known information about the network, and a second endpoint device, connected to the second subnet, comprising a second processor configured to receive the command from the server device, and responsive to receiving the command, generate a second set of network activity in the second subnet, the second set of network activity being chosen so that no properly operating second subnet endpoint will respond to the second set of network activity in a manner inconsistent with known information about the network.

In another example, a client device may include a network interface configured to send and receive data via a network having a plurality of endpoints, and a processor. The processor may be configured to receive, over the network and from a network management server, a first set of instructions, responsive to receiving the first set of instructions, generate network activity that is chosen so that no properly operating endpoint will respond to the network activity, receive, over the network from a device, a response to the network activity store information identifying the device, receive, over the network from the network management server, a second set of instructions, and responsive to receiving the second set of instructions, send information over the network identifying the device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
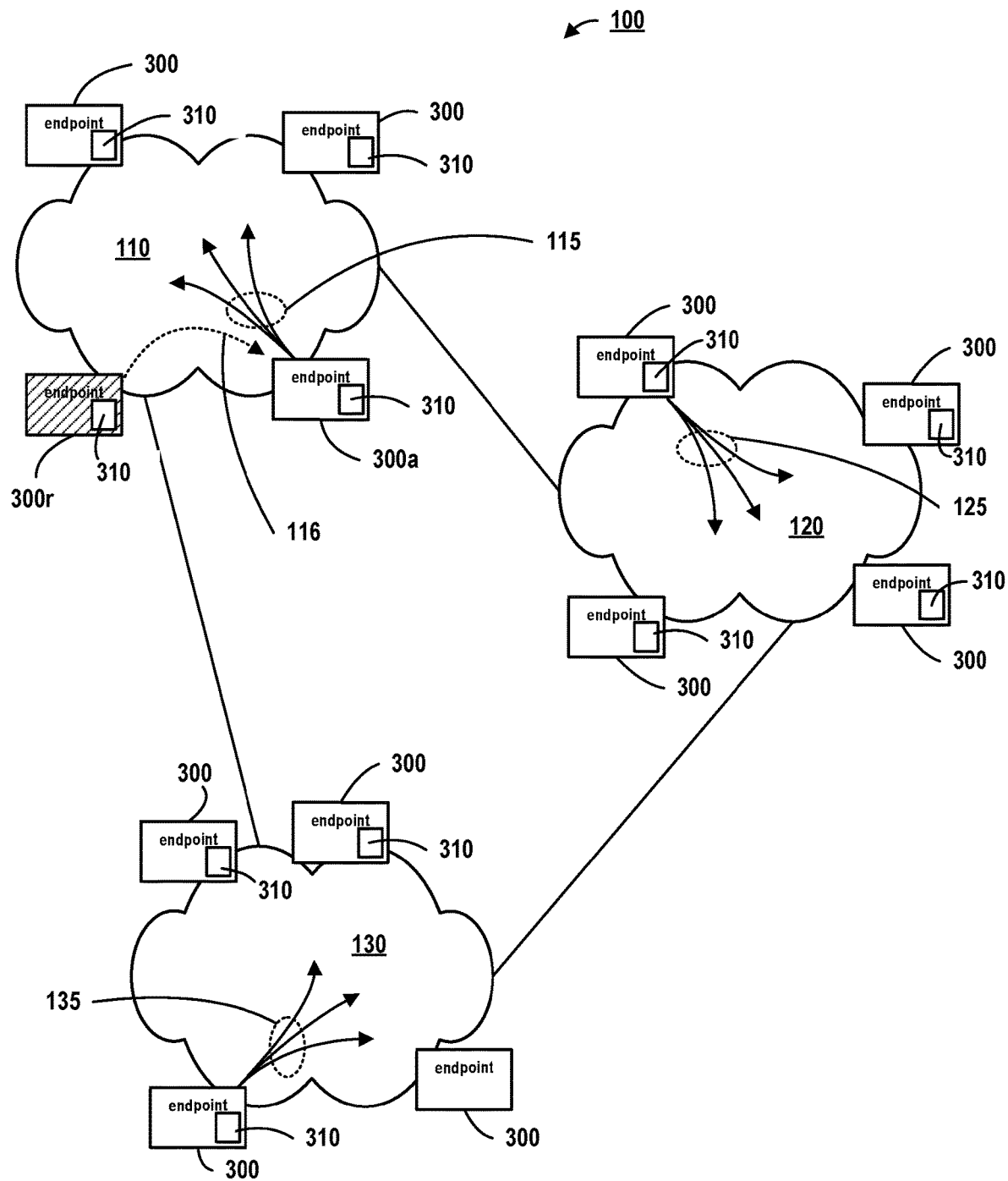
FIG. 1 is a block diagram illustrating an example system that is configured to perform techniques in accordance with one or more aspects of the present disclosure.

FIG. 1 is a block diagram illustrating an example network 100 including computing devices or endpoints that may be configured in accordance with one or more aspects of the present disclosure. Network 100 includes a number of subnets, including subnet 110, subnet 120, and subnet 130. In some examples, a subnet is a portion of a network that shares a common address component. On TCP/IP networks, subnets may include all devices whose IP addresses have the same prefix (e.g., all IP addresses that start with 100.100.100 may be part of the same subnet). In other examples, a subnet may also refer to a segment or a portion of a network. Dividing a network into subnets or network segments may be useful for security and performance reasons.

Each subnet may include a number of endpoints 300. Each endpoint device 300 may be any type of computing device, including a computer, a desktop or laptop computer, a tablet, a smart phone, a mobile device, a server, an appliance, or a thin client. Additional examples of a possible endpoint device 300 include televisions, personal digital assistants (PDA), portable gaming systems, media players, e-book readers, mobile television platforms, automobile navigation and entertainment systems, vehicle (e.g., automobile, aircraft, or other vehicle) displays, or any other types of wearable and non-wearable, mobile or non-mobile computing devices that may be connected to a network.

One or more of endpoints 300 may include storage devices 310, which may store instructions associated with one or more applications. Such instructions may include instructions that when executed cause endpoint device 300 to perform network management tasks in accordance with one or more aspects of the present disclosure. Instructions associated with other applications may also be stored on storage devices 310.

A large network, such as an enterprise network, that is made up of thousands of computers, or even hundreds of thousands of computers, is hard to manage, hard to monitor, and is vulnerable to security risks. Such a network may consist of many subnets. Each of the many endpoints on a network may be a potential security risk.

In some examples, an endpoint-delivered security threat may take the form of an unauthorized user gaining access to an authorized device on the network. Such access could be unauthorized physical access, such as a person that is not an employee of a bank gaining access to a bank computer by sitting down in the bank's mortgage office at a desk having a computer on the bank's network. In another example, an unauthorized user may gain physical access to a network access port and connect a device to the network through the access port. An unauthorized user may also gain access to the network by remotely connecting to a network using compromised security credentials. Such an unauthorized user may access other secure enterprise information, or may also install malicious software or malware designed to further compromise the security of the network.

In other examples, an endpoint-delivered security threat may manifest itself through an authorized, as opposed to unauthorized, user. For example, an authorized network user can be the source of an endpoint-delivered security threat if the authorized network user is tricked into downloading and installing malicious software or malware. Such software may be hostile or intrusive software, and may present itself in a number of forms, including computer viruses, worms, trojan horses, ransomware, spyware, adware, and other malicious programs.

Opportunistic attackers and those attempting targeted threats on organizations may also use socially-engineered emails sent to corporate email accounts to compromise user endpoints. This strategy may be easy to execute and cost effective as attackers can execute the attack remotely, enabling attacks across multiple users, and at multiple different times.

In other examples, security threats may be delivered through an infected computing device or portable device being introduced into the corporate network by an authorized user. The infected computing device may then deliver malware that can spread laterally. Endpoint protection has become more complicated as users connect their own devices into the corporate network and as more users work remotely. In many situations, not all endpoints on a network will have passed through corporate security controls, and as a result, not all traffic on such a device will go through approved corporate security controls. In many cases an organization may not have control over every endpoint, and may have difficulty implementing desired endpoint security solutions.

Threats to network security can also take the form of an authorized user on the network acting maliciously. In another example, an endpoint that is simply not acting properly or is malfunctioning could conceivably pose a security risk by compromising network security or information.

Although endpoint-security risk or other threats to network security may arise in a number of different ways, any such threat or rogue device can do harm to a network, steal information, and disrupt network operations. Once compromised, an endpoint may give up an enterprise's valuable information along with access credentials that are keys to critical systems and data. In some examples, a rogue device that has gained access to a network may attempt to gain information or network credentials by operating as part of a network, impersonating other endpoints or resources on the network, or by spying on network traffic. A rogue device may, for example, respond to network traffic or requests made by other endpoints on the network. If it is able to communicate with other devices on the network, a rogue device may be able to gain access to useful information that may provide further access to resources on the network.

In some examples, such as in an enterprise network, rogue devices may be detected by taking advantage of knowledge that the enterprise has about its own network. For example, because in many cases an enterprise network is controlled by one entity, the types of endpoints on the network and the nature of the traffic on the network are known by that entity. Accordingly, the entity controlling the network may be able discern legitimate or normal network activity from network activity that is not legitimate or that would not be expected to be seen on the network.

In other words, it may be possible for an entity that controls an enterprise network to tell the difference between "good" network traffic and "bad" network traffic. Traffic that may be considered "good" is traffic that may normally be expected to occur on the network as a result of typical operations, such as requests for resources that are known to be on the network, or attempted communications between trusted devices known to be on the network. Traffic that may be considered "bad" traffic may be traffic that might never be expected on the network or traffic that seems to be nonsense. For example, "bad" traffic might include a request made over the network for a resource that is known to not exist.

A rogue device on the network, however, may not have the ability to discern legitimate network activity from network activity that may not normally be expected to be seen on the network. In some examples, it may be possible to take advantage of this lack of knowledge by a rogue device to detect its presence on the network.

For example, in accordance with the techniques described in this disclosure, a rogue device on a network might be detected by generating simulated network traffic, and determining if any endpoints on the network react to the simulated network traffic in anomalous or unexpected ways. In some examples, such simulated network activity may be designed or chosen so that it will be ignored by all legitimate and valid endpoints. In some examples, such simulated network activity may be ignored by all legitimate and valid endpoints without any additional configuration. If there is an endpoint that does not ignore such network activity, then that endpoint may be associated with a rogue device, which may represent a security risk.

Figure 2:
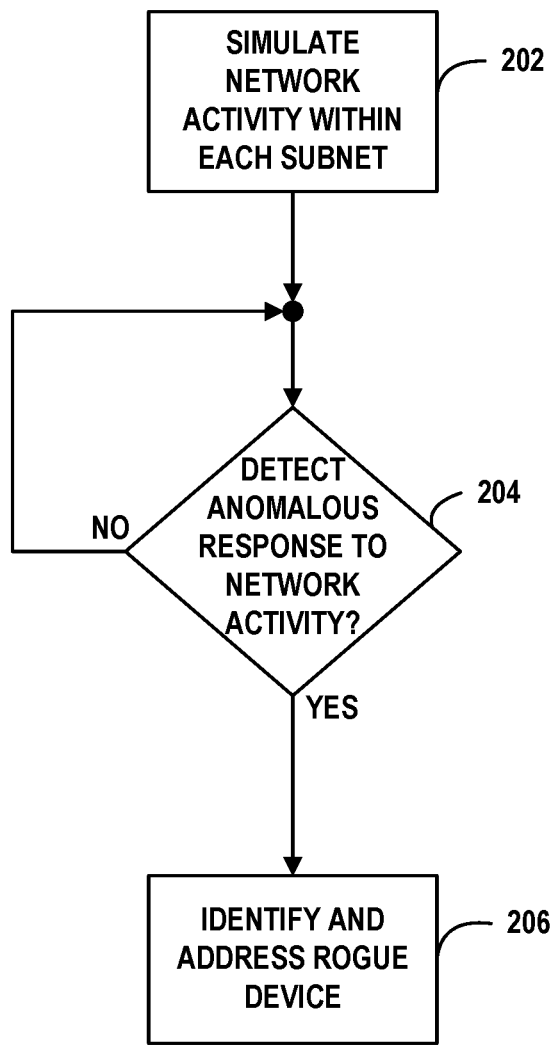
FIG. 2 is a flowchart illustrating example operations in a network in accordance with one or more aspects of the present disclosure.

FIG. 2 is a flowchart illustrating an example operation of a system that may be configured to detect a rogue endpoint in accordance with one or more aspects of the present disclosure. The process of FIG. 2 may be performed by one or more endpoint devices 300 on network 100, such as endpoint device 300a on network 100 from FIG. 1. For purposes of illustration, FIG. 2 is described below within the context of network 100 from FIG. 1.

With reference to FIG. 1, an endpoint device 300 (e.g., endpoint device 300a) in subnet 110 generates network activity 115 and broadcasts that traffic on subnet 110 (202). Network activity 115 may, in some examples, be a request to resolve a name. In other examples, network activity 115 may be a request or communications involving one or more other protocols that may be used in connection with network 100.

In some examples, network activity 115 generated by endpoint device 300a is designed or chosen so that a legitimate or valid endpoint would normally ignore it (NO path from 204). In such an example, network activity 115 may be designed or chosen so that any endpoint that does not ignore the activity may not be acting properly or may be acting anomalously. An endpoint that does not ignore the network activity might then be identified as acting in an improper manner and accordingly, may be a rogue device.

In other examples, network activity 115 may be designed or chosen so that one or more endpoints 300 on subnet 110 may respond to network activity 115 in particular way, but any endpoint device 300 that does not respond in the prescribed fashion may be identified as a rogue device.

In the example of FIG. 1, one of the endpoints 300, endpoint device 300r, is shown responding to network activity 115 through network activity 116. If network activity 115 is designed or chosen such that no properly operating endpoint device 300 would respond to network activity 115, any responding endpoint device 300r may be a rogue endpoint on network 100. In such an example, further actions may be taken to identify and address any such endpoint device 300r before that endpoint device 300r provides a security risk or a further security risk to assets on network 100 (206).

In FIG. 1, although one of the endpoints 300, i.e., endpoint device 300a, is shown generating network activity 115, in other examples any of the other endpoints 300 on subnet 110 may alternatively or also generate network activity 115. As shown in FIG. 1, many or all of endpoints 300 may include storage devices 310, and such storage devices 310 may include instructions that when executed cause the associated endpoint device 300 to perform network management tasks in accordance with one or more aspects of the present disclosure. Network activity similar to that described in connection with subnet 110 in FIG. 1 may also take place in subnet 120 and/or subnet 130. As shown in FIG. 1, network activity 125 may be generated by one of the endpoints 300 on subnet 120. Also, network activity 135 may be generated by one of the endpoints 300 on subnet 130. Each such network activity, network activity 125 on subnet 120, and network activity 135 on subnet 130, may be an attempt to detect rogue devices in a manner similar to that described in connection with subnet 110.

In other examples, rather than detecting a response to network activity, an endpoint could watch for network activity that should never occur. For example, if an entity is in a position to know and understand the operation of its enterprise network well, there may be some operations that the entity can determine will never occur in a properly functioning network. For example, it may be possible to determine that types of activity on the network should never appear as part of network traffic. In another example, some networks may be configured such that an attempt to resolve a particular name, even a valid name on the network, should never occur. In such an example, if an endpoint or other device attempts to resolve such a name, that may indicate that an endpoint may be spying on network traffic, and attempting to use information collected from spying activities to access network resources or other assets on the network. Such an endpoint may be identified as a threat to network security.

Figure 3:
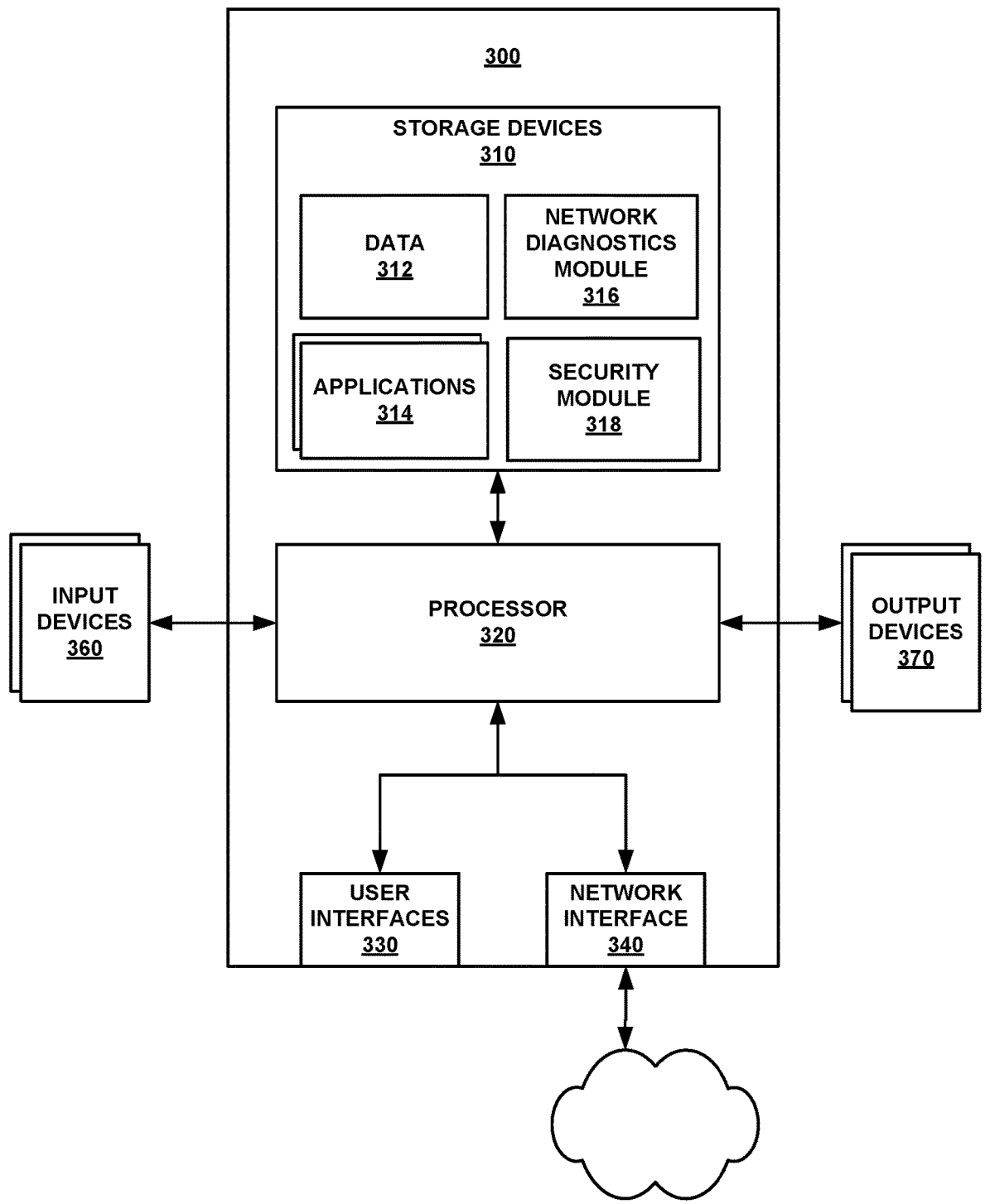
FIG. 3 is a block diagram illustrating an example client device that is configured to perform techniques in accordance with one or more aspects of the present disclosure.

FIG. 3 is a block diagram illustrating an example endpoint, endpoint device, client device, or client computer 300. Endpoint device 300 may take many forms, and may be any type of computing device, including a computer, a desktop or laptop computer, a tablet, a smart phone, a mobile device, a server, an appliance, or a thin client. Additional examples include televisions, personal digital assistants (PDA), portable gaming systems, media players, e-book readers, mobile television platforms, automobile navigation and entertainment systems, vehicle (e.g., automobile, aircraft, or other vehicle) displays, or any other types of wearable and non-wearable, mobile or non-mobile computing devices that may be connected to a network.

In the example shown in FIG. 3, endpoint device 300 includes a number of components in an example arrangement. In the example of FIG. 3, endpoint device 300 includes storage devices 310, processor 320, user interfaces 330, and network interface 340. Processor 320 executes instructions associated with applications 314, network diagnostics module 316, and/or security module 318. Instructions for applications 314, network diagnostics module 316, and security module 318 may be stored in storage devices 310. Data 312 used by applications 314 or network diagnostics module 316 or security module 318 may also be stored in storage devices 310. Storage devices 310 may represent one or more of any of a variety of random access memory (RAM), read-only memory (ROM), and/or long-term storage memory, alone or in any combination.

Processor 320 may represent one or more processing units, such as a single hardware-based processor, multiple cores of a processor, multiple processors operating together, application processors, display controllers, auxiliary processors, one or more sensor hubs, digital signal processors (DSPs), application specific integrated circuits (ASICs), field programmable gate arrays (FPGAs), any hardware configured to function as a processor, or any combination thereof. In general, processor 320 may be implemented as, or at least includes, hardware-based elements, such as processing circuitry (e.g., computer chips, including logic circuitry, formed on silicon dies).

Network interface 340 represents one or more interfaces for communicating via a network such as network 100 from FIG. 1. Network interface 340 may represent, for example, one or more of a network interface card (NIC), a radio for communicating over a radio access network (RAN), a wireless network card (which may conform to one or more IEEE 802.11 standards), or the like, alone or in any combination. Endpoint device 300 may receive input from input devices 360 and may provide output to output devices 370.

User interfaces 330 may represent any interfaces for receiving input from and/or providing output to a user. User interfaces 330 may include, for example, any or all of a keyboard, mouse, touch pad, track pad, universal serial bus (USB), speaker, display, touchscreen, camera, microphone, physical button, printer, or the like, alone or in any combination.

Applications 314 may represent various applications that processor 320 executes, e.g., at the direction of receiving input from a user via a user interface. Applications 314 generally represent any applications that may be executed by a device, such as endpoint device 300. In accordance with one or more aspects of this disclosure, one or more of applications 314 may represent applications that perform a secure communication session with server devices on network 100 in FIG. 1. For example, applications 314 may include mobile banking applications, stock brokerage applications, virtual private network (VPN) applications, online merchant applications (such as online music vendors, online video vendors, online retail vendors, or the like), or any other such applications needing secured communication sessions.

Figure 4:
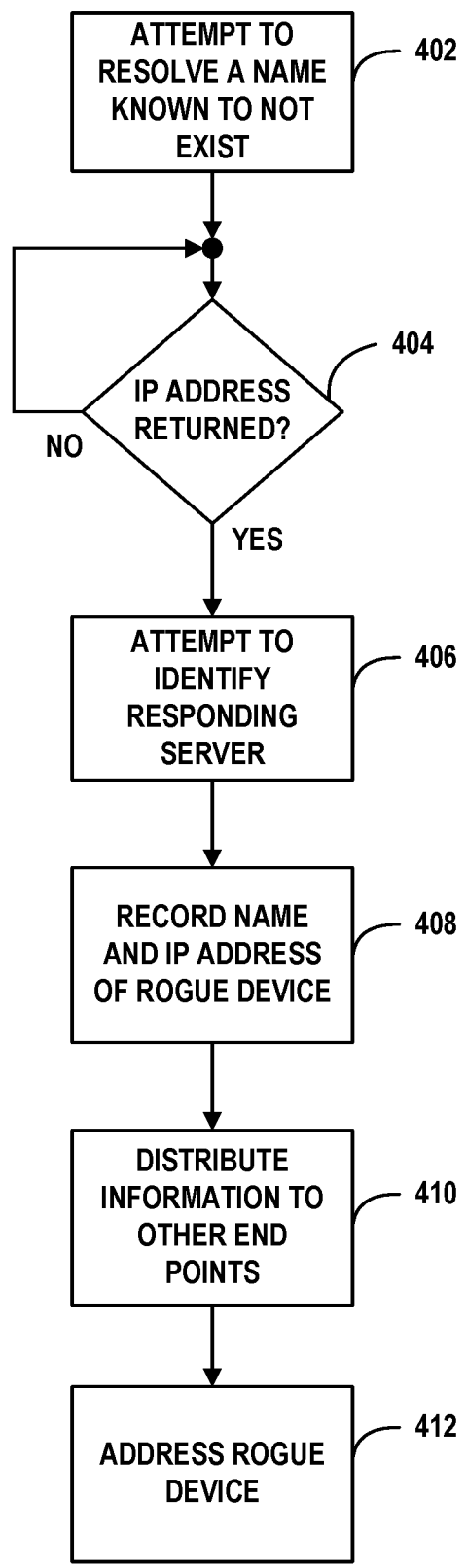
FIG. 4 is a flowchart illustrating an example operation of a system that is configured to detect a rogue device using a name resolution protocol in accordance with one or more aspects of the present disclosure.

FIG. 4 is a flowchart illustrating an example operation of a system that is configured to detect a rogue endpoint in accordance with one or more aspects of the present disclosure. The process of FIG. 4 may be performed by components of a network, such as network 100 of FIG. 1, and endpoint device 300 of FIG. 3. For purposes of illustration, FIG. 4 is described below within the context of network 100 and endpoint device 300. In the example of FIG. 4, an example technique is described that may be used to detect a rogue device. In the example of FIG. 4, endpoint device 300r of FIG. 1 may be attempting an attack that exploits vulnerabilities using NetBIOS Name Service (NBNS), Link-Local Multicast Name Resolution (LLMNR) protocol, and/or WINS (Microsoft Windows' implementation of the NetBIOS Name Service).

In a network of Microsoft Windows computers, a rogue device or endpoint on the network may enable a malicious user or malware to recover usernames and hashed credentials from other computers on the same network segment. In a WINS implementation, when a device on the network needs to determine the IP address for a given hostname, the device may first determine whether the local hosts file contains the IP address for the desired hostname. If the local host file does not contain the IP address for the desired hostname, a DNS lookup will be initiated, querying the device's or the network's designated DNS server. If the DNS lookup fails, a broadcast request may be initiated through NBNS or through the Link-Local Multicast Name Resolution (LLMNR) protocol. (LLMNR can be considered to be a protocol based on the Domain Name System (DNS) packet format that allows both IPv4 and IPv6 hosts to perform name resolution for hosts on the same local link, and may be used in environments using computers running Microsoft Windows operating system variants.)

Due to the nature of the NBNS and LLMNR protocols, the first response received may be considered an authoritative resolution of the hostname in question. This may allow an attacker or rogue device on the network to impersonate a valid but unknown or mistyped host by responding with the attacker's IP address. If the attacking device issues an authentication challenge to the poisoned host, the poisoned host may attempt authentication, and may result in the compromise of the currently logged in user's Windows domain name, username, and password hash. The attacker may then be able to prompt an authentication handshake without any user interaction, and the rogue device may then attempt to recover the plain text password from the password hash utilizing offline password recovery techniques.

In the example of FIG. 4, one or more of the endpoints 300 of FIG. 1 may be used to detect a rogue device attempting an attack exploiting vulnerabilities associated with NBNS. With reference to FIG. 1 and FIG. 3, network diagnostics module 316 causes one of the endpoints 300 (e.g., endpoint device 300a in FIG. 1) to generate and output network activity 115 over subnet 110 via network interface 340 within endpoint device 300a. In the example of FIG. 4, network activity 115 may be an attempt to resolve a hostname that is known to not exist on network 100 (402). For an enterprise network, as described previously, characteristics of network 100 may be known, so it may be possible to conceive of a hostname that is known to not exist on network 100. As described above, endpoint device 300a may initiate a broadcast request or ping operation through the NBNS or the LLMNR protocol.

Network diagnostics module 316 within storage devices 310 causes endpoint device 300a to monitor network interface 340 for responses to network activity 115. Normally, since the name sought to be resolved should not be found on the network, there may be no IP address returned in response to the broadcast request (NO path from 404). In such a case, a rogue device on network 100 might not be identified.

However, in some examples, one of the endpoints 300 on the network may respond to network activity 115 with an IP address. In the example shown in FIG. 1, endpoint device 300*r* responds to network activity 115 with its IP address, identifying itself as the host corresponding to the hostname requested through the broadcast request through the NBNS or LLMNR protocol (YES path from 404). Because the requested hostname was chosen to be a hostname that is known to not exist on network 100, in some examples endpoint device 300*r* should not have responded. Accordingly, endpoint device 300*r* may be a rogue device or endpoint that may be operated by a malicious user, or may be infected by malware, or may otherwise be a compromised endpoint.

Referring again to FIG. 1, if endpoint device 300*r* is attempting to perpetuate an NBNS attack and responds to endpoint device 300*a* with its IP address, network diagnostics module 316 within endpoint device 300*a* may cause endpoint device 300*a* to attempt to identify the name of the responding server, such as by performing a reverse ping operation to determine the true name of endpoint device 300*r* (406). Network diagnostics module 316 may also cause endpoint device 300*a* to record in storage devices 310 of endpoint device 300*a* the name and/or IP address of endpoint device 300*r*, so that in some examples, endpoint device 300*a* may avoid further interactions with endpoint device 300*r* (408). Network diagnostics module 316 may also cause endpoint device 300*a* to distribute information to other endpoints 300 on the network (410) by transmitting information over network 100 via network interface 340 within endpoint device 300*a*. In some examples, this may enable other endpoints to avoid interactions with endpoint device 300*r*. Other measures may also be taken to address security or other risks presented by endpoint device 300*r*, which may include security module 318 causing endpoint device 300*a* to perform other operations, such as communicating over network 100 via network interface 340 in furtherance of remediating or addressing security risks posed by endpoint device 300*r* (412). Further measures may also be taken, including removing endpoint device 300*r* from the network.

Although in the example of FIG. 1, endpoint device 300*a* detects a response from endpoint device 300*r* on the same subnet 110. In other examples, it may be possible that endpoint device 300*a* may detect a response from a device on a different subnet, such as subnet 120 or subnet 130. In this way, endpoint device 300*a* may be able to detect a potentially rogue device on a different subnet.

Although the process of FIG. 4 has been described in the context of a detecting rogue device attempting an attack that exploits vulnerabilities using NetBIOS Name Service, in other examples, a similar process may be employed to detect one or more devices that may be attempting an attack exploiting vulnerabilities of other protocols, systems, procedures, routines, or techniques. For example, detecting attacks involving address resolution protocol (ARP), dynamic host configuration protocol (DHCP), or domain name system (DNS) may include generating simulated network activity pursuant to or consistent with such protocols, and attempting to detect anomalous responses or network activity that may be inconsistent with known information about the network.

In other examples, it may be possible to detect rogue devices attempting to exploit vulnerabilities of some routing protocols, gateway protocols, protocols for shaping network traffic flows, or related protocols which may include Hot Standby Routing Protocol (HSRP), Routing Information Protocol (RIP), Border Gateway Protocol (BGP), Open Shortest Path First (OSPF), Enhanced Interior Gateway Routing Protocol (EIGRP), Multiprotocol Label Switching (MPLS), Neighbor Discovery protocol for IPv6 (i.e., RFC 4861), or Intra-Site Automatic Tunnel Addressing Protocol (ISATAP). In some examples, routes or other information discovered or detected on a network may be compared to known valid or good routes, and if any routes are discovered that are not known to be good, such routes or further investigation of such routes may reveal one or more devices or endpoints that may represent a security threat.

In still other examples, it may be possible to identify a malicious host that may be acting as a rogue proxy, or one that may be operating improperly in promiscuous mode, or one that may be attempting to exploit vulnerabilities of Web Proxy Auto-Discovery protocol (WPAD), and/or potentially spying on the network. If one or more devices are performing network operations that are anomalous or are inconsistent with known information about the network, such devices or endpoints may be identified as a potential security threat, or may be candidates for further investigation of a security threat.

In some respects, FIGS. 3 and 4 describe an example client device comprising: a network interface configured to send and receive data via a network having a plurality of endpoints; and a processor configured to: receive, over the network and from a network management server, a first set of instructions, responsive to receiving the first set of instructions, generate network activity that is chosen so that no properly operating endpoint will respond to the network activity, receive, over the network from a device, a response to the network activity store information identifying the device, receive, over the network from the network management server, a second set of instructions, and responsive to receiving the second set of instructions, send information over the network identifying the device.

Figure 5:
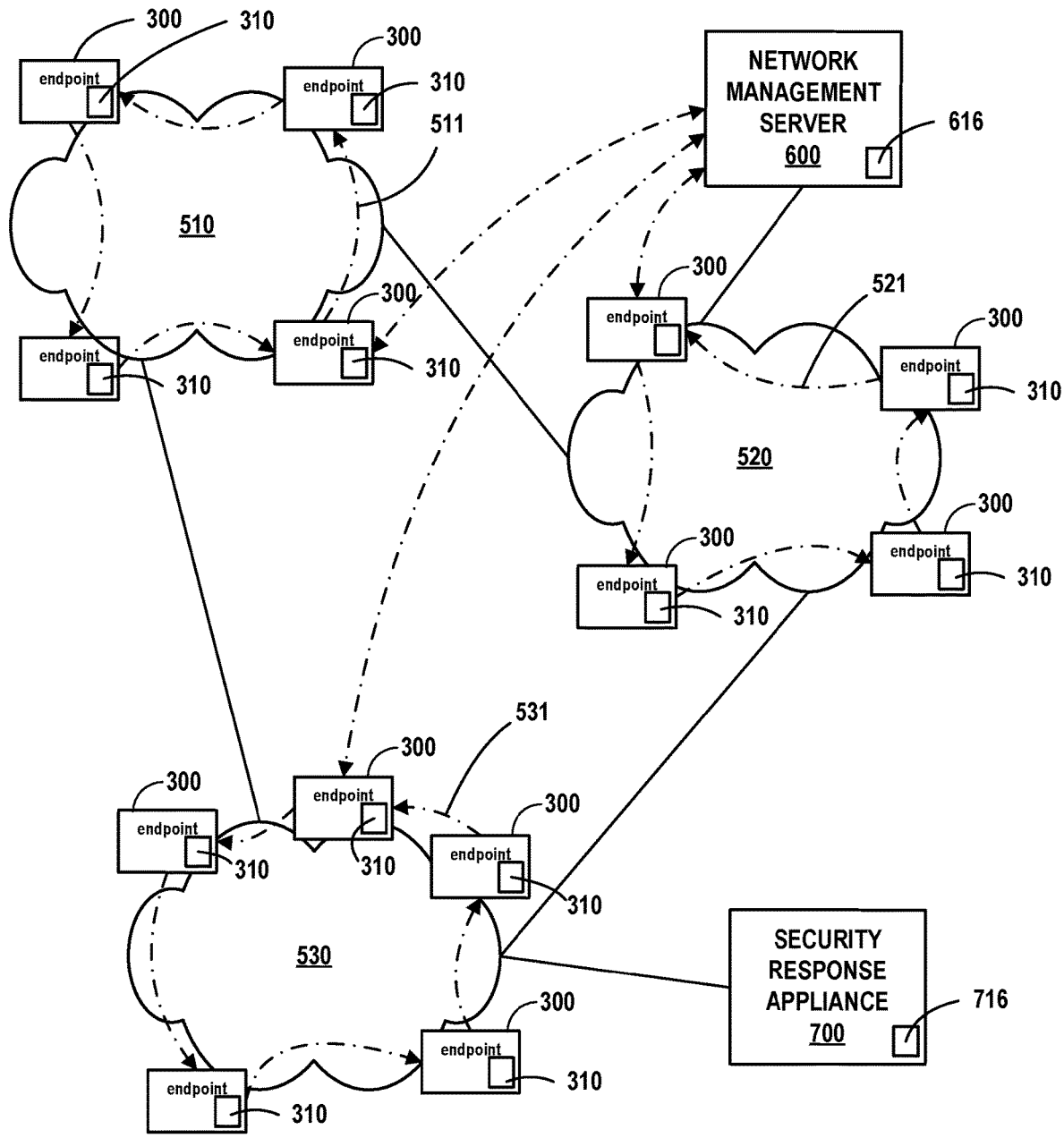
FIG. 5 is a block diagram illustrating an example system, including multiple chains of endpoints, that is configured to perform techniques in accordance with one or more aspects of the present disclosure.

FIG. 5 is a block diagram illustrating an example network 500 including computing devices or endpoint device that may be configured in accordance with one or more aspects of the present disclosure. Network 500 includes a number of subnets, including subnet 510, subnet 520, and subnet 530. Each subnet includes a number of endpoints 300. Also included in network 500 is network management server 600, which may be a network management server, which in some examples may be a Tanium Server that is part of Tanium's network management suite of products, available from Tanium Inc. of Emeryville, Calif. Network management server 600 includes at least one storage devices 610 that may store instructions that when executed cause network management server 600 to perform network management operations; such instructions may correspond to Tanium Server software. Network management server 600 may be on subnet 110, subnet 120, or subnet 130. In other examples, network management server 600 may be on a different subnet, or possibly may be considered to be on no subnet at all.

In the architecture of FIG. 5, a separate chain of endpoints 300 may be established in each network segment or subnet, including those that are contiguous with a neighboring network segment or subnet. For example, in FIG. 5, a chain 511 of endpoints 300 is shown within subnet 510, illustrated by dot-dashed lines. Similarly, a chain 521 of endpoints 300 is shown within subnet 520, and a chain 531 of endpoints 300 is shown within subnet 530. In each such chain, each network-accessible endpoint device 300 within the chain may include at least one storage device 310 that stores network diagnostics module 316 instructions that when executed cause the endpoint to perform network management tasks. Such instructions may be Tanium client software that may be designed to operate and/or interact with network management server 600. Such instructions may, when executed, cause endpoints 300 to create a chain of endpoints within each subnet autonomously, or at the direction of one or more additional computers, devices, or modules, such network management server 600. For example, chains of endpoints may be created in response to a command, set of commands, or set of instructions delivered or issued by network management server 600. Each endpoint device 300 within the chain may have a forward and backward link in the chain, which may enable information to be exchanged with or information to be queried from many endpoints 300 in network 500 without flooding the network with broadcast requests.

By using a chain of endpoints, in some examples, it may be possible to exchange or collect information about network 500, or to query endpoints 300 within network 500 by passing information along in network 500 along one or more chains of endpoints. In one example, information may be passed to a first endpoint in subnet 510, and then each endpoint device 300 in the chain 511 in subnet 510 may pass along the information to the next forward link in the chain, until the information passes through each accessible endpoint in subnet 510. One of the endpoint devices 300 in the chain 511, which might be considered the leader of chain 511 in subnet 510, may communicate directly with the network management server 600. Such a procedure may reduce the amount of network traffic required to pass information to or collect information from endpoints 300 in subnet 510, and may also provide an efficient platform to query each endpoint device 300 in subnet 510 about its status or other information, or to perform operations on subnet 510 or on endpoints 300 within subnet 510. In some examples, network diagnostics module 316 within one or more of each of the endpoints 300 may establish the chain 511 autonomously, by querying endpoints on the same network segment or subnet.

By implementing chains within some or all subnets or network segments within network 500, it may be possible to efficiently query each endpoint device 300 in the network 500 about its status or other information, or to efficiently perform operations network-wide on endpoints 300 in network 500, which may enable detection procedures or techniques that would otherwise be difficult, inefficient, or impossible. Where multiple chains are created within a network, an endpoint device within each chain of endpoints within a subnet (e.g., the leader of the chain) may communicate directly with network management server 600, sending information to network management server 600 or receiving commands or information from network management server 600.

Although network 500 is described as implementing multiple chains of endpoints, each of which may generally be confined to a subnet, it may be possible in other examples for a chain of endpoints to span multiple subnets or network segments, or even an entire network. Chains of endpoints similar to those described herein and/or implemented in one or more aspects of the present disclosure may be further described in the following references, each of which is hereby incorporated by reference: U.S. Pat. Nos. 8,086,729, 8,903,973, 8,904,039, 8,972,566, 9,059,961, 9,246,977, and US. Patent Publication Nos. US20140181247, US20140181295, US20150149624, US20150163132, US20150271284, US20150271285.

Also included in FIG. 5 is security appliance 700, which may be a device that includes at least one storage devices 710 that stores instructions that when executed causes security appliance 700 to perform security response operations, either automatically or at the direction of security operations teams or other personnel that may seek to manage security threats. Such operations may include automating threat data collection, enrichment, verification, and response processes before, during, or after a security threat alert is received. Such operations may further include providing assistance in confirming malware infections, and checking for evidence of past infections. Such operations may also include automatically adding internal and external context and intelligence data to any security alerts. Such instructions may be Threat Response software available from Proofpoint, Inc. of Sunnyvale, Calif. In some examples, client Threat Response software available from Proofpoint may also be deployed in storage devices 310 within each of the endpoints 300 on network 500.

Figure 6:
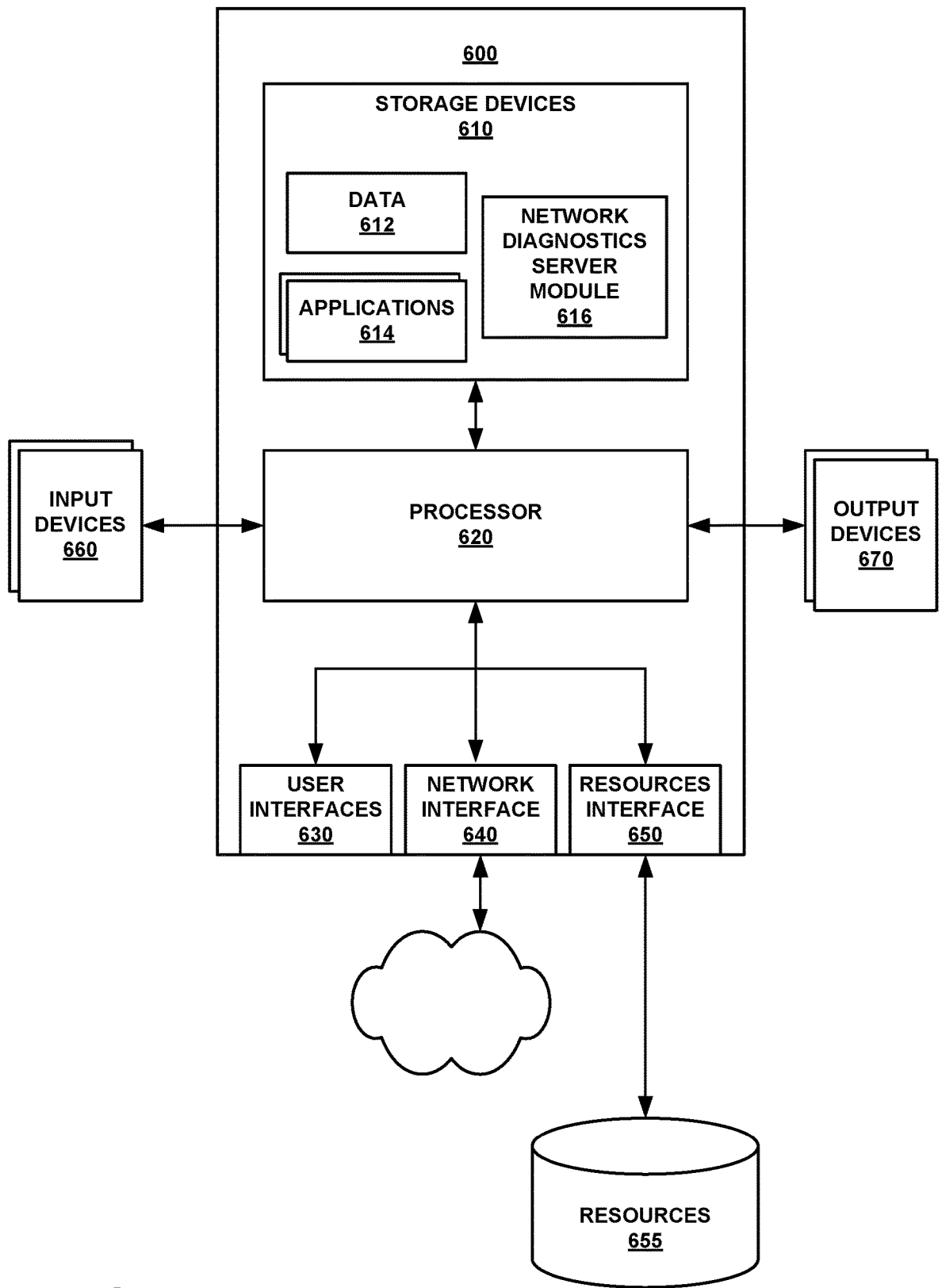
FIG. 6 is a block diagram illustrating an example server device that is configured to perform techniques in accordance with one or more aspects of the present disclosure.

FIG. 6 is a block diagram illustrating an example network management server 600. As with endpoint device 300, network management server 600 may take many forms, and may be any type of computing device, including a computer, a desktop or laptop computer, a tablet, a smart phone, a mobile device, a server, or an appliance. Network management server 600 may be implemented in other types of computing devices as well.

Network management server 600 includes storage devices 610, processor 620, user interfaces 630, network interface 640, and resources interface 650. Processor 620 executes instructions associated with applications 614 and/or network diagnostics module 616. Instructions for applications 614 and network diagnostics module 616 may be stored in storage devices 610. Network diagnostics module 616 may correspond to instructions associated with network management server software from Tanium, Inc. Data 612 used by applications 614 or network diagnostics module 616 may also be stored in storage devices 610. Storage devices 610 may represent one or more of any of a variety of random access memory (RAM), read-only memory (ROM), and/or long-term storage memory, alone or in any combination.

Processor 620 may represent one or more processing units, such as a single hardware-based processor, multiple cores of a processor, multiple processors operating together, application processors, display controllers, auxiliary processors, one or more sensor hubs, digital signal processors (DSPs), application specific integrated circuits (ASICs), field programmable gate arrays (FPGAs), any hardware configured to function as a processor, or any combination thereof. In general, processor 620 may be implemented as, or at least includes, hardware-based elements, such as processing circuitry (e.g., computer chips, including logic circuitry, formed on silicon dies).

Network interface 640 represents one or more interfaces for communicating via a network such as network 500. Network interface 640 may represent, for example, one or more of a network interface card (NIC), a radio for communicating over a radio access network (RAN), a wireless network card (which may conform to one or more IEEE 802.11 standards), or the like, alone or in any combination. Network management server 600 further includes resources interface 650, which may be used to interact with resources 655, which may include, for example, one or more external resources to network management server 600, such as, for example, other server devices, processes, databases, or the like. Network management server 600 may receive input from input devices 660 and may provide output to output devices 670.

User interfaces 630 may represent any interfaces for receiving input from and/or providing output to a user. User interfaces may include, for example, any or all of a keyboard, mouse, touch pad, track pad, universal serial bus (USB), speaker, display, touchscreen, camera, microphone, physical button, printer, or the like, alone or in any combination.

Applications 614 may represent various applications that processor 620 executes, e.g., at the direction of receiving input from a user via user interfaces 630. Applications 614 generally represent any applications that may be executed by a device or computer.

Referring now to both FIG. 5 and FIG. 6, network diagnostics module 616 within network management server 600 provides the capability communicate with endpoints that are configured to operate with network management server 600. In some examples, network management server 600 includes network diagnostics module 616, which may be Tanium server software instructions stored in storage devices 610, and endpoints 300 in network 500 may include a network diagnostics module, such as network diagnostics module 316 shown in FIG. 3, which may correspond to Tanium client software instructions stored in storage devices 310. When network management server 600 is configured with Tanium server software, network management server 600 may send commands or instructions to endpoints and cause such endpoints in network 500 to carry out certain operations (e.g., in the Tanium platform, such operations may be referred to as Tanium Actions). Further, when network management server 600 is configured with Tanium server software, network management server 600 may send commands or instructions to endpoints to query, read, or obtain information from properly configured endpoints in network 500 (e.g., in the Tanium platform, such operations may be referred to as Tanium Sensors). Such commands, instructions, or queries (e.g., Tanium Actions or Tanium Sensors) may be carried out using one or more of the chains illustrated in FIG. 5 (e.g., chain 511, chain 521, and/or chain 531). In some examples, network management server 600 may be able to reach and/or communicate with any endpoint 300 on the network, regardless of what subnet a given endpoint device 300 may be connected to. In other examples, network management server 600 may interact with only a subset of endpoint devices 300 on the network 500.

The network management server 600 of FIG. 6 may represent an example server device comprising a network interface configured to send and receive data via a network, wherein the network comprises a first subnet including a first plurality of endpoints and a second subnet including a second plurality of endpoints; and a processor configured to: send, over the network, a first set of instructions to a first endpoint device connected to the first subnet, wherein the first set of instructions cause the first endpoint device to generate a first set of network activity that is chosen so that no properly operating endpoint will respond to the first set of network activity, send, over the network, a second set of instructions to a second endpoint device connected to the second subnet, wherein the second set of instructions cause the second endpoint device to generate a second set of network activity that is chosen so that no properly operating endpoint will respond to the second set of network activity, and send, over the network, a request for information from the second endpoint device.

Similarly, storage devices 610 of FIG. 6 may represent a computer readable storage medium having computer instructions stored thereon, that, when executed, cause a processor in a server device to send, over the network, a first set of instructions to a first endpoint device connected to the first subnet, wherein the first set of instructions cause the first endpoint device to generate a first set of network activity that is chosen so that no properly operating endpoint will respond to the first set of network activity, send, over the network, a second set of instructions to a second endpoint device connected to the second subnet, wherein the second set of instructions cause the second endpoint device to generate a second set of network activity that is chosen so that no properly operating endpoint will respond to the second set of network activity, and send, over the network, a request for information from the second endpoint device.

Figure 7:
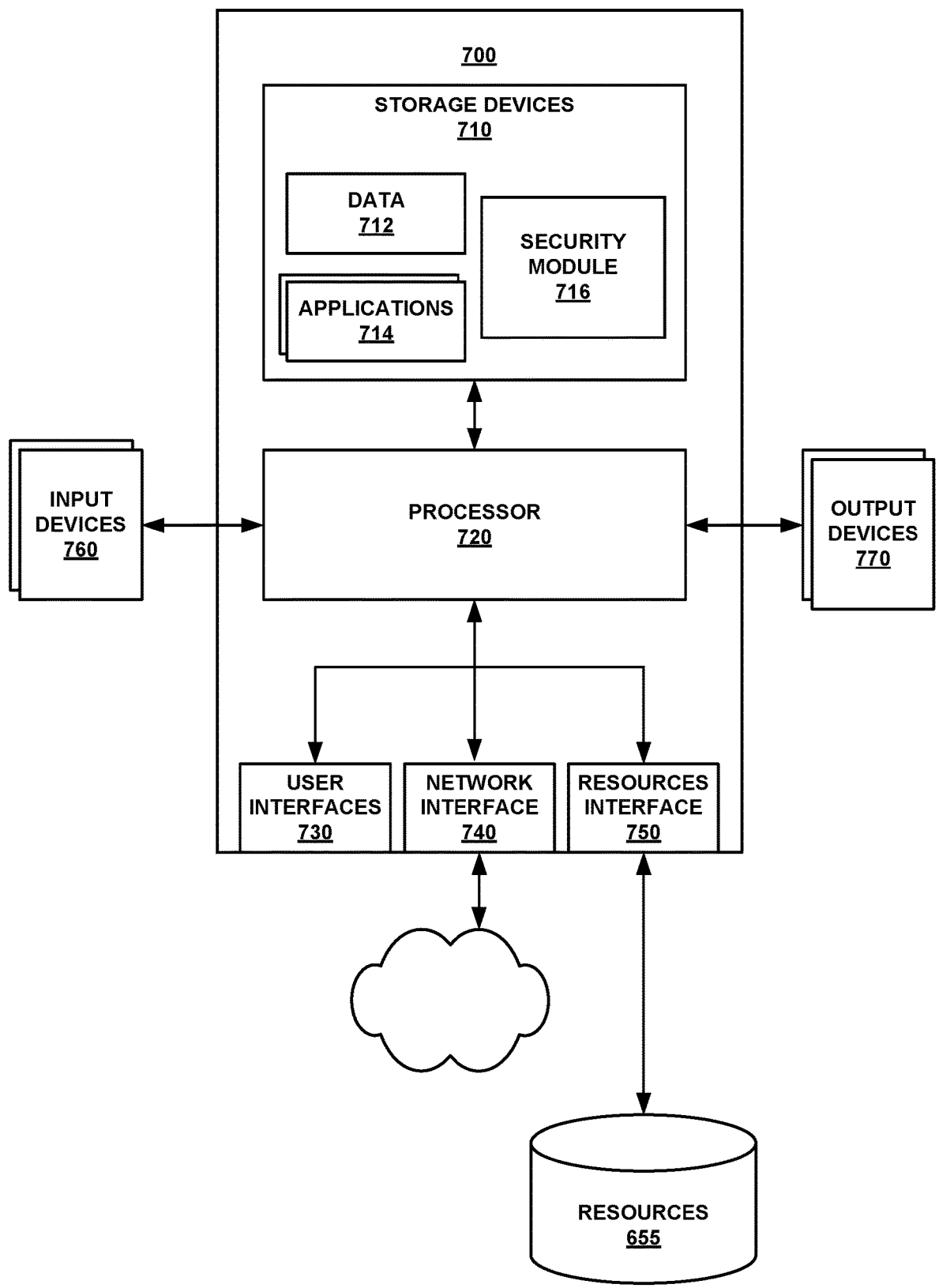
FIG. 7 is a block diagram illustrating an example security appliance that is configured to perform techniques in accordance with one or more aspects of the present disclosure.

FIG. 7 is a block diagram illustrating an example security appliance 700. As with network management server 600 and endpoint device 300, security appliance 700 may take many forms. Security appliance 700 includes storage devices 710, processor 720, user interfaces 730, network interface 740, and resources interface 750. Processor 720 executes instructions associated with applications 714 and/or security module 716. Instructions for applications 714 and security module 716 may be stored in storage devices 710. Security module 716 may correspond to instructions associated with network management server software from Tanium, Inc. Data 712 used by applications 714 or security module 716 may also be stored in storage devices 710. Storage devices 710 may represent one or more of any of a variety of random access memory (RAM), read-only memory (ROM), and/or long-term storage memory, alone or in any combination.

Processor 720 may represent one or more processing units, such as a single hardware-based processor, multiple cores of a processor, multiple processors operating together, application processors, display controllers, auxiliary processors, one or more sensor hubs, digital signal processors (DSPs), application specific integrated circuits (ASICs), field programmable gate arrays (FPGAs), any hardware configured to function as a processor, or any combination thereof. In general, processor 720 may be implemented as, or at least includes, hardware-based elements, such as processing circuitry (e.g., computer chips, including logic circuitry, formed on silicon dies).

Network interface 740 represents one or more interfaces for communicating via a network such as network 500. Network interface 740 may represent, for example, one or more of a network interface card (NIC), a radio for communicating over a radio access network (RAN), a wireless network card (which may conform to one or more IEEE 802.11 standards), or the like, alone or in any combination. Security appliance 700 further includes resources interface 750, which may be used to interact with resources 655, which may include, for example, one or more external resources to security appliance 700, such as, for example, other server devices, processes, databases, or the like. Security appliance 700 may receive input from input devices 760 and may provide output to output devices 770.

User interfaces 730 may represent any interfaces for receiving input from and/or providing output to a user. User interfaces may include, for example, any or all of a keyboard, mouse, touch pad, track pad, universal serial bus (USB), speaker, display, touchscreen, camera, microphone, physical button, printer, or the like, alone or in any combination.

Applications 714 may represent various applications that processor 720 executes, e.g., at the direction of receiving input from a user via user interfaces 730. Applications 714 generally represent any applications that may be executed by a device or computer.

Referring now to both FIG. 5 and FIG. 7, security module 716 within security appliance 700 may be configured to receive alerts from endpoints that are configured to operate with security appliance 700. In some examples, security module 716 may be Proofpoint Threat Response software instructions stored in storage devices 710, and endpoints 300 in network 500 may include a security module, such as security module 318 shown in FIG. 3, which may be Proofpoint client software instructions stored in storage devices 310. When configured with such software, security appliance 700 may receive security alerts. Such security alerts may notify or provide information to a security analyst for use in investigation of potential security threats.

Figure 8:
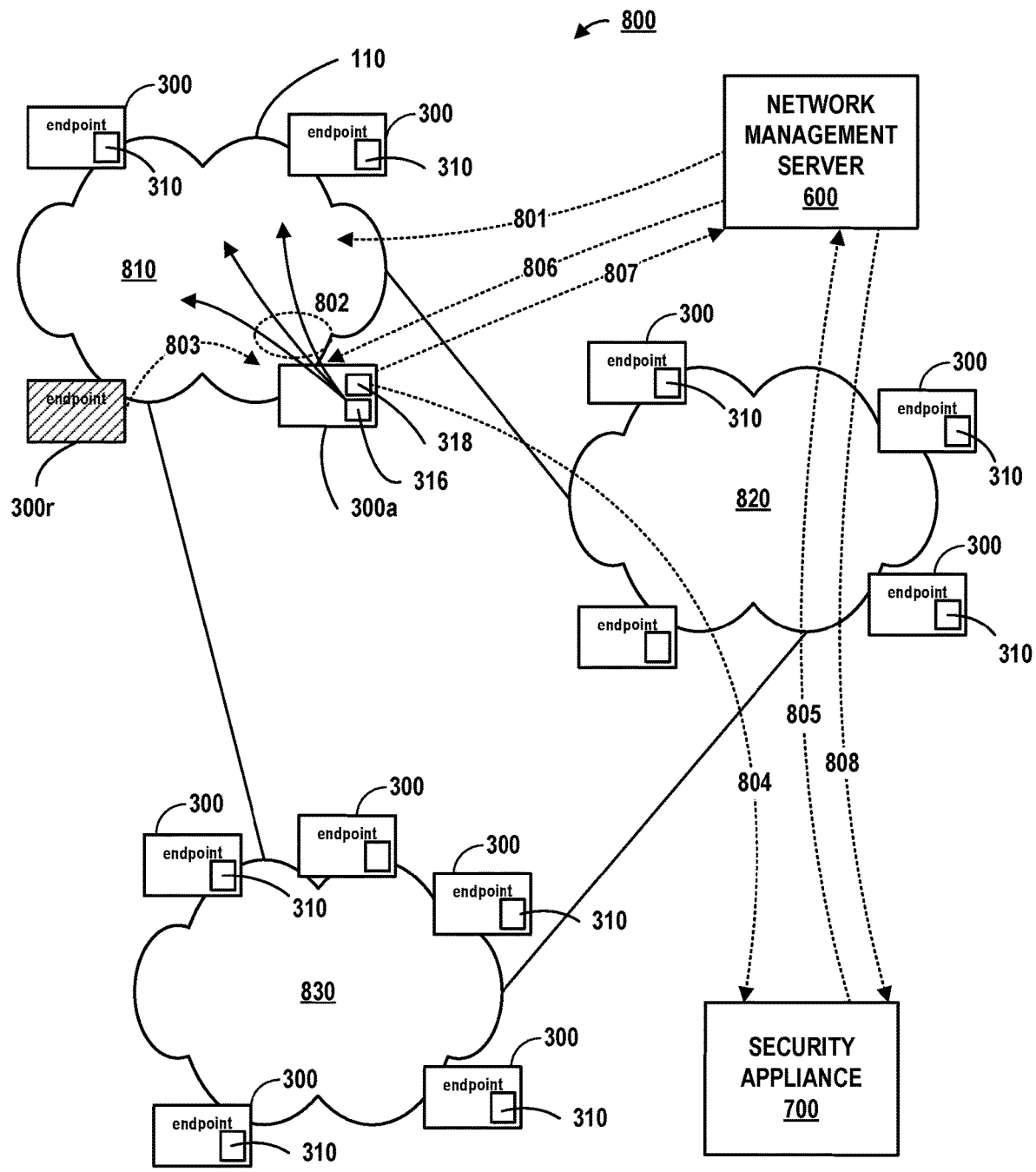
FIG. 8 is a block diagram illustrating an example system including a network management server and a security appliance that is configured to perform techniques in accordance with one or more aspects of the present disclosure.

FIG. 8 is a block diagram illustrating an example network 800 including computing devices or endpoints 300 that may be configured in accordance with one or more aspects of the present disclosure. Network 800 includes a number of subnets, including subnet 810, subnet 820, and subnet 830. Each subnet includes a number of endpoints. Also included in network 800 is network management server 600, which may correspond to network management server described in connection with FIG. 6. Further included in network 800 is security appliance 700, which may correspond to the security appliance described in connection with FIG. 7. In the example described in connection with FIG. 8, network management server 600 may be a Tanium Server that is part of Tanium's network management suite of products, and security appliance 700 may be a Proofpoint Threat Response device.

In the example of FIG. 8, endpoint device 300r may be attempting a name resolution attack similar to that described in connection with FIG. 4. FIG. 8 is an example of how such an attack may be detected; dashed lines shown in FIG. 8 illustrate network operations performed within network 800. In FIG. 8, network management server 600, which may be a Tanium Server, may send a command or instructions or a Tanium Action or similar routine to endpoints 300 in subnet 810 to cause a Tanium Action or similar routine to be initiated by endpoints 300 in subnet 810 (801). Network management server 600 may similarly send or cause to be initiated Tanium Actions or similar routines involving endpoints within subnet 820 and subnet 830 or endpoints on any other subnets within network 800. Endpoints 300 within subnet 810 that are configured with Tanium client software (e.g., network diagnostics module 316 stored on storage devices 310 within endpoint device 300a) may receive such commands, instructions, or Tanium Actions and in response, may initiate a Tanium Action or similar routine.

Pursuant to the Tanium Action or similar routine, which may in some examples be implemented through code written in VB Script, one or more of the endpoints in subnet 810 may attempt to resolve a hostname that is known to not exist. In the illustration of FIG. 8, endpoint device 300a sends a broadcast request to resolve a hostname (802). Normally, valid endpoints would not respond to an attempt at resolving such a name, because the name does not exist on network 800. In the example of FIG. 8, however, endpoint device 300r responds to the request by sending its IP address to endpoint device 300a (803). Accordingly, endpoint device 300a may determine that endpoint device 300r may be a possible rogue device. Endpoint 300a stores data within storage devices 310 that may document the response received from endpoint device 300r. Such information may include the IP address of endpoint device 300r and the name of endpoint device 300r, if such information was successfully obtained by endpoint device 300a, such as through a reverse ping operation. Endpoint 300a may store such data. Such storage may occur in some examples at the direction of the Tanium Action being executed by endpoint device 300a. In some examples, endpoint device 300a may create an information page and store the information page within the Tanium subdirectories in a file system within endpoint device 300a. In other examples, endpoint device 300a may store some or all of such information in a registry entry.

In response to the data being stored, a security alert may be sent to security appliance 700 by endpoint device 300a (804). In some examples, such as where endpoint device 300a is configured with Threat Response software (security module 318 within endpoint device 300a), the security alert may be triggered by data being stored in storage devices 310 within endpoint device 300a at a location monitored by the Threat Response software executing on endpoint device 300a. In some examples, if the data is stored in a location or in such a way that it is not on any whitelist describing permitted changes, a security alert may be generated and transmitted to security appliance 700.

In response to a security alert being sent to security appliance 700 (804), a security analyst may be notified of the security alert and prompted to perform further investigation. Security appliance 700, which may be operated by a security analyst, may then use a Tanium Sensor or a similar routine to read the information (e.g., in the information page) stored on endpoint device 300a. In some examples, security appliance 700 may send a request to network management server 600 (805) to initiate a Tanium Sensor or similar routine to read the information page. In response to receiving the request, network management server 600 sends or initiates a Tanium Sensor or similar routine for or to endpoint device 300a, reading the requested information from endpoint device 300a (806). In response, network management server 600 may receive the requested information (807), and may pass the requested information along to security appliance 700 (808) where it may be analyzed by a security analyst. The security analyst may view the information received about the endpoint device 300r. Such information may include the IP address of endpoint device 300r and the name of endpoint device 300r. The security analyst may then use other tools available to address or remediate endpoint device 300r, which may include removing endpoint device 300r from network 800.

Figure 9:
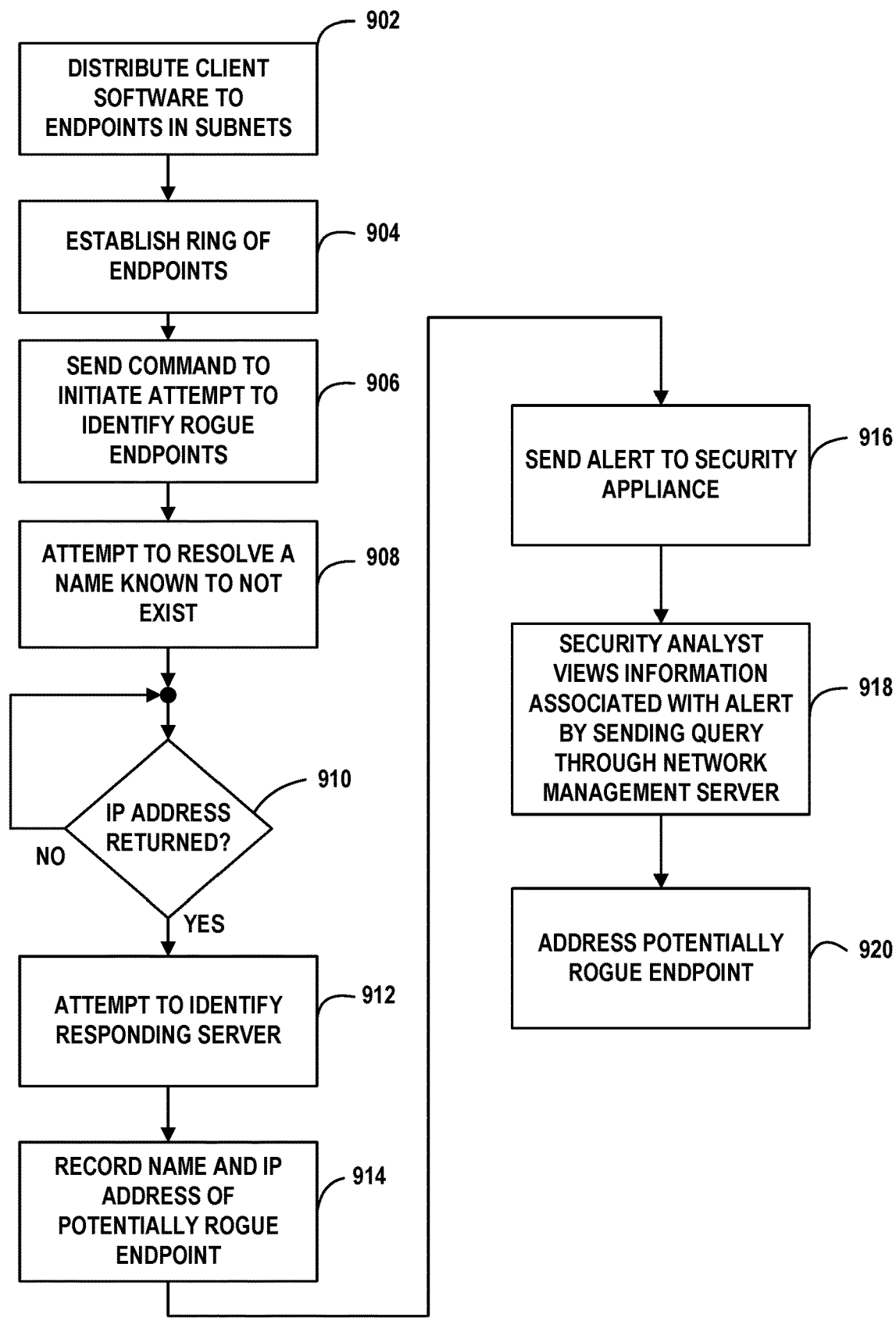
FIG. 9 is a flowchart illustrating an example operation of a system that is configured to detect a rogue device using a name resolution protocol in accordance with one or more aspects of the present disclosure.

FIG. 9 is a flowchart illustrating an example process for a system that is configured to detect a rogue endpoint in accordance with one or more aspects of the present disclosure. The process of FIG. 9 may be performed by components of a network, such as network 800 of FIG. 8, endpoint device 300 of FIG. 3, network management server 600 of FIG. 6, and security appliance 700 of FIG. 7. For purposes of illustration, FIG. 9 is described below within the context of network 800. In the example of FIG. 9, a technique is described that may be used to detect a rogue device that may be attempting an attack that exploits vulnerabilities using NetBIOS Name Service or specifically, WINS, which is Microsoft Windows' implementation of the NetBIOS Name Service (NBNS).

In FIG. 9, client software corresponding to network diagnostics module 316 may be distributed to endpoints 300 within network 800, which may endpoints 300 within subnet 810, subnet 820, and subnet 830 (902). Software corresponding to network diagnostics module 316 may be Tanium client software for use with network management server 600; network management server 600 may be a Tanium or similar server. Network management server 600 may have some involvement in distributing software corresponding to network diagnostics module 316 software to endpoints. In some examples, software corresponding to network diagnostics module 316 is downloaded by each endpoint from the Tanium or similar server (network management server 600), or the Tanium server or similar server may actively distribute such software to endpoints within network 800. In some examples, the Tanium server or similar server may distribute software corresponding to network diagnostics module 316 to endpoints in the process of creating one or more of the chains 511, 521, or 531 as described in connection with FIG. 5. In other examples, network management server 600 may have little or no involvement in distributing software corresponding to network diagnostics module 316 to endpoints within network 800.

In some examples, network management server 600 may initiate creation of a ring of endpoints, in a manner such as that described in connection with FIG. 5 (904). Such an architecture may improve the speed in which information may be collected from endpoints and may also reduce the amount of network traffic that may be involved in collecting information from endpoints. Such an architecture may provide other benefits, including the ability to cause endpoints to perform actions, such as simulating network traffic in accordance with one or more aspects of the present disclosure. In some examples, software corresponding to network diagnostics module 316, such as Tanium software or Tanium client software, provides a useful platform for implementing diagnostic and detection techniques in accordance with one or more aspects of the present disclosure. Such a platform may enable significant administrative advantages, efficiencies, and benefits that may not be available otherwise or without an alternate implementation or design. In particular, use of Tanium software or a similar platform in network 800 may enable detection techniques in accordance with this disclosure to be performed on each subnet within network 800. In some examples, if at least one endpoint device 300 on each subnet within network 800 is configured with Tanium software, detection techniques in accordance with the present disclosure may be performed. Such detection techniques may be possible and particularly efficient in some examples involving an enterprise network that includes hundreds of thousands of endpoints 300 and many thousands of subnets.

Network management server 600 may send a command or instructions to endpoints on network 800, which may cause endpoints within multiple subnets to attempt to identify rogue devices (906). If network management server 600 is a Tanium server, this may involve sending or initiating a Tanium Action or similar routine to or within subnets within network 800. In some examples, where an attempt is being made to detect rogue devices that may be attempting an attack exploiting vulnerabilities of the NetBIOS Name Service, network management server 600 may send or initiate a command or a Tanium Action or similar routine with respect to some or all endpoints within network 800 running Tanium client software. As a result of such a command or Tanium Action, one or more endpoints may attempt to resolve a name known to not exist (908). If an IP address is sent to an endpoint attempting to resolve such a name, such as endpoint device 300*a* in FIG. 8, endpoint device 300*a* may determine that a rogue device is on network 800 (910). In some examples, endpoint device 300*a* may attempt to identify the device responding to the name resolution request (912), and may store locally information identifying the rogue device (914).

In some examples, endpoint device 300*a* may cause an alert to be sent to security appliance 700 as a result of identifying a rogue device (916). In some examples, endpoint device 300*a* may send the alert directly, or in other examples, software executing on endpoint device 300*a* may detect that information identifying the rogue device was stored, and this may cause an alert to be send to security appliance 700. Other methodologies for sending an alert to security appliance 700 may alternatively be employed. In other examples, an alert may be sent to another device or to a mobile device that may be carried by a security analyst. In some examples, a security analyst may view information associated with the alert. Such information may be included with the alert, or in other examples, a security analyst may query endpoint device 300*a* for further information associated with the alert (918). Such a query may include use of a Tanium Sensor or similar routine to query information from endpoint device 300*a*, thereby retrieving such information so that it may be viewed at security appliance 700. In some examples, such information may identify the IP address of the potentially rogue device and also the name of the rogue device. The security analyst may then use available tools to address or remove any detected rogue devices from network 800.

In this manner, FIG. 9 illustrates an example system including a network comprising a first subnet having a plurality of first subnet endpoints, and a second subnet having a plurality of second subnet endpoints; a server device connected to the network; a first endpoint device, connected to the first subnet, comprising a first processor configured to receive a command from the server device, and responsive to receiving the command, generate a first set of network activity in the first subnet, the first set of network activity being chosen so that no properly operating first subnet endpoint will respond to the first set of network activity in a manner inconsistent with known information about the network; and a second endpoint device, connected to the second subnet, comprising a second processor configured to receive the command from the server device, and responsive to receiving the command, generate a second set of network activity in the second subnet, the second set of network activity being chosen so that no properly operating second subnet endpoint will respond to the second set of network activity in a manner inconsistent with known information about the network.

Similarly, FIG. 9 represents, in some respects, an example process for sending, over a network and by a server device, a first set of instructions to a first endpoint device connected to a first subnet, wherein the network comprises a first subnet including a first plurality of endpoints and a second subnet including a second plurality of endpoints, and wherein the first set of instructions cause the first endpoint device to generate a first set of network activity that is chosen so that no properly operating endpoint will respond to the first set of network activity; sending, over the network and by the server device, a second set of instructions to a second endpoint device connected to the second subnet, wherein the second set of instructions cause the second endpoint device to generate a second set of network activity that is chosen so that no properly operating endpoint will respond to the second set of network activity; and sending, over the network by the server device after sending the second set of instructions, a request for information from the second endpoint device.

Figure 10:
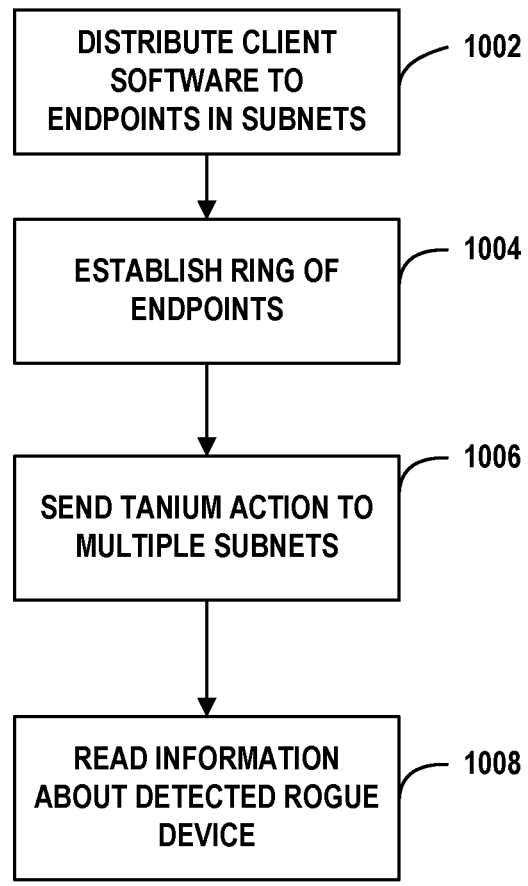
FIG. 10 is a flowchart illustrating example operations performed by a network management server in a network in accordance with one or more aspects of the present disclosure.

FIG. 10 is a flowchart illustrating an example process that may be performed at least partially by a network management server in accordance with one or more aspects of the present disclosure. In some examples, such a process may be performed by network management server 600 in a system such as that shown in FIG. 8. For purposes of illustration, FIG. 10 is described below within the context of FIG. 8.

In FIG. 10, client software is distributed to endpoints within network 800, which may include endpoints 300 within subnet 810, subnet 820, and subnet 830 (1002). Such software may be Tanium client software or similar for use with network management server 600. As described in connection with FIG. 9, network management server 600 may be a Tanium server, and network management server 600 may have some involvement in distributing such client software to endpoints. Such involvement may include client software being downloaded by each endpoint from network management server 600, or network management server 600 actively distributing such software to endpoints within network 800. In some examples, network management server 600 may distribute software to endpoints 300 in the process of creating a chain of endpoints as described in connection with FIG. 5. And as described in connection with FIG. 9, in other examples network management server 600 may have little or no involvement in distributing client software to endpoints within network 800.

In some examples, network management server 600 may initiate creation of a ring of endpoints, in a manner such as that described in connection with FIG. 5 (1004). Such an architecture may be particularly efficient, and enable detection techniques in accordance with the present disclosure to be performed in a network with hundreds of thousands of endpoints 300, and many thousands of subnets, as previously described. Such an architecture, in some examples, may include chains or rings of endpoints that are generally confined to network subnets or segments, but in other examples such an architecture may include one or more chains or rings of endpoints that span more than one subnet, or the entire network. If network management server 600 is configured as a Tanium server, it may send a Tanium Action to subnets within network 800 (1006). For example, to detect rogue devices that may be attempting an attack exploiting vulnerabilities of the NetBIOS Name Service, network management server 600 may send a command, instructions, or a Tanium Action or similar routine to some or all endpoints 300 within network 800 running Tanium client software. As a result of such a Tanium Action, one or more endpoints may identify a rogue device on network 800 in the manner described in connection with the example of FIG. 8. In some examples, an endpoint identifying a rogue device on network 800 may store locally information identifying the rogue device. Network management server 600 may use a Tanium Sensor to retrieve that information from the endpoint that identified the rogue device (1008).

This disclosure describes various operations, such as ping operations, generating network activity, or detecting responses or other attributes of the network. In some cases, such operations, or some aspects of such operations, may be performed using by tools built into operating systems installed at endpoints or other devices on the network, such as the Windows operating system, Unix variants, Mac operating systems, or Solaris.

It is to be recognized that depending on the example, certain acts or events of any of the techniques described herein may be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A method comprising:
determining, by a computing system connected to an enterprise network, and based on information about hostnames associated with endpoint devices known to be available on a subnet included within the enterprise network, a set of network activity that uses a hostname chosen so that the network activity will not invoke a response by any of a plurality of endpoint devices that are operating normally on the subnet;
sending, over the enterprise network and by the computing system, a set of instructions to an endpoint device connected to the subnet, wherein the set of instructions cause the endpoint device to generate the network activity on the subnet;
receiving, over the enterprise network and by the computing system, information identifying a rogue device that responded to the network activity on the subnet; and
performing a security response operation to remediate the rogue device, wherein performing the security response operation includes causing one or more of the plurality of endpoint devices on the subnet to be instructed to avoid interaction with the rogue device.

2. The method of claim 1, further comprising:
prior to sending the set of instructions, sending, over the network and by the computing system, an initial set of instructions that cause the plurality of endpoints to organize into a chain of endpoints.

3. The method of claim 2, wherein sending the initial set of instructions includes:
enabling, by the computing system, communication among the plurality of endpoint devices using the chain of endpoints.

4. The method of claim 3, wherein receiving the information identifying the rogue device includes:
receiving the information in response to the communication among the plurality of endpoints.

5. The method of claim 1, wherein the subnet is a first subnet, wherein the set of network activity is a first set of network activity, wherein the set of instructions is a first set of instructions, wherein the plurality of endpoint devices is a first plurality of endpoint devices, and wherein the rogue device is a first rogue device, the method further comprising:
determining, by the computing system, and based on information about hostnames associated with endpoint devices known to be available on a second subnet included within the enterprise network, a second set of network activity that will not invoke a response by any of a second plurality of endpoint devices that are operating normally on the second subnet;
sending, over the enterprise network and by the computing system, a second set of instructions to an endpoint device connected to the second subnet, wherein the second set of instructions cause the endpoint device connected to the second subnet to generate the second set of network activity on the second subnet;
receiving, over the enterprise network by the computing system, information identifying a second rogue device that responded to the second set of network activity on the second subnet; and
performing, by the computing system, a security response operation to remediate the second rogue device, wherein performing the security response operation to remediate the second rogue device includes causing one or more of the second plurality of endpoint devices on the second subnet to be instructed to avoid interaction with the second rogue device.

6. The method of claim 5, further comprising:
prior to sending the first set of instructions, sending, over the network and by the computing system, a first set of initial instructions that cause the first plurality of endpoints to organize into a first chain of endpoints; and
prior to sending the second set of instructions, sending, over the network and by the computing system, a second set of initial instructions that cause the second plurality of endpoints to organize into a second chain of endpoints.

7. The method of claim 6,
wherein sending the first set of initial instructions includes enabling, by the computing system, communication among the first plurality of endpoint devices using the first chain of endpoints; and
wherein sending the second set of initial instructions includes enabling, by the computing system, communication among the second plurality of endpoint devices using the second chain of endpoints.

8. The method of claim 7,
wherein receiving the information identifying the first rogue device includes receiving the information identifying the first rogue device in response to the communication among the first plurality of endpoints; and
wherein receiving the information identifying the second rogue device includes receiving the information identifying the second rogue device in response to the communication among the second plurality of endpoints.

9. A system connected to an enterprise network comprising:
a storage device; and
processing circuitry having access to the storage device and configured to:
determine, based on information about hostnames associated with endpoint devices known to be available on a subnet included within the enterprise network, a set of network activity that uses a hostname chosen so that the network activity will not invoke a response by any of a plurality of endpoint devices that are operating normally on the subnet,
send, over the enterprise network, a set of instructions to an endpoint device connected to the subnet, wherein the set of instructions cause the endpoint device to generate the network activity on the subnet,
receive, over the enterprise network, information identifying a rogue device that responded to the network activity on the subnet, and
perform a security response operation to remediate the rogue device, wherein performing the security response operation includes causing one or more of the plurality of endpoint devices on the subnet to be instructed to avoid interaction with the rogue device.

10. The system of claim 9, wherein the processing circuitry is further configured to:

prior to sending the set of instructions, send, over the network, an initial set of instructions that cause the plurality of endpoints to organize into a chain of endpoints.

11. The system of claim 10, wherein to send the initial set of instructions, the processing circuitry is further configured to:
enable communication among the plurality of endpoint devices using the chain of endpoints.

12. The system of claim 11, wherein to receive the information identifying the rogue device the processing circuitry is further configured to:
receive the information in response to the communication among the plurality of endpoints.

13. The system of claim 9, wherein the subnet is a first subnet, wherein the set of network activity is a first set of network activity, wherein the set of instructions is a first set of instructions, wherein the plurality of endpoint devices is a first plurality of endpoint devices, wherein the rogue device is a first rogue device, and wherein the processing circuitry is further configured to:
determine, based on information about attributes of a second subnet included within the enterprise network, a second set of network activity that will not invoke a response by any of a second plurality of endpoint devices that are operating normally on the second subnet;
send, over the enterprise network, a second set of instructions to an endpoint device connected to the second subnet, wherein the second set of instructions cause the endpoint device connected to the second subnet to generate the second set of network activity on the second subnet;
receive, over the enterprise network, information identifying a second rogue device that responded to the second set of network activity on the second subnet; and
perform a security response operation to remediate the second rogue device, wherein performing the security response operation to remediate the second rogue device includes causing one or more of the second plurality of endpoint devices on the second subnet to be instructed to avoid interaction with the second rogue device.

14. The system of claim 13, wherein the processing circuitry is further configured to:
prior to sending the first set of instructions, send, over the network, a first set of initial instructions that cause the first plurality of endpoints to organize into a first chain of endpoints; and
prior to sending the second set of instructions, send, over the network, a second set of initial instructions that cause the second plurality of endpoints to organize into a second chain of endpoints.

15. The system of claim 14,
wherein to send the first set of initial instructions, the processing circuitry is further configured to enable communication among the first plurality of endpoint devices using the first chain of endpoints; and
wherein to send the second set of initial instructions, the processing circuitry is further configured to enable communication among the second plurality of endpoint devices using the second chain of endpoints.

16. The system of claim 15,
wherein to receive the information identifying the first rogue device the processing circuitry is further configured to receive the information identifying the first rogue device in response to the communication among the first plurality of endpoints; and
wherein to receive the information identifying the second rogue device the processing circuitry is further configured to receive the information identifying the second rogue device in response to the communication among the second plurality of endpoints.

17. A computer-readable storage medium comprising instructions that, when executed, configure processing circuitry of a computing system to:
determine, based on information about types of endpoints known to be on a subnet included within the enterprise network, a set of network activity that uses a hostname chosen so that the network activity will not invoke a response by any of a plurality of endpoint devices that are operating normally on the subnet;
send, over the enterprise network, a set of instructions to an endpoint device connected to the subnet, wherein the set of instructions cause the endpoint device to generate the network activity on the subnet;
receive, over the enterprise network, information identifying a rogue device that responded to the network activity on the subnet; and
perform a security response operation to remediate the rogue device, wherein performing the security response operation includes causing one or more of the plurality of endpoint devices on the subnet to be instructed to avoid interaction with the rogue device.

18. The computer-readable storage medium of claim 17, wherein the instructions, when executed, further configure the processing circuitry to:
prior to sending the set of instructions, send, over the network, an initial set of instructions that cause the plurality of endpoints to organize into a chain of endpoints.

19. The computer-readable storage medium of claim 18, wherein to send the initial set of instructions, the instructions further configure the processing circuitry to:
enable communication among the plurality of endpoint devices using the chain of endpoints.

20. The computer-readable storage medium of claim 19, wherein to receive the information identifying the rogue device the instructions further configure the processing circuitry to:
receive the information in response to the communication among the plurality of endpoints.

* * * * *